United States Patent [19]

Wheland

[11] Patent Number: 4,966,949
[45] Date of Patent: Oct. 30, 1990

[54] PROCESS FOR INCREASING THE MOLECULAR WEIGHT OF A POLYAMIDE WITH P CONTAINING CATALYST

[75] Inventor: Robert C. Wheland, Wilmington, Del.

[73] Assignee: E. I. Du Pont de Nemours and Company, Wilmington, Del.

[21] Appl. No.: 262,936

[22] Filed: Oct. 20, 1988

[51] Int. Cl.$^5$ ............................................. C08G 69/48
[52] U.S. Cl. .................................... 525/420; 525/419; 528/487
[58] Field of Search ................. 525/420, 419; 528/487

[56] References Cited

U.S. PATENT DOCUMENTS

| | | | |
|---|---|---|---|
| 3,365,428 | 1/1968 | Wujciak | 260/78 |
| 3,763,113 | 10/1973 | Burrows et al. | 260/78 |
| 4,912,175 | 3/1990 | Wheland et al. | 525/420 |

OTHER PUBLICATIONS

U.S. Pat. No. 3,306,875; cols 1-2, 35-36.

Primary Examiner—Harold D. Anderson
Attorney, Agent, or Firm—William H. Hamby

[57] ABSTRACT

This invention relates to an improved process for increasing the molecular weight of a polyamide.

8 Claims, No Drawings

PROCESS FOR INCREASING THE MOLECULAR WEIGHT OF A POLYAMIDE WITH P CONTAINING CATALYST

BACKGROUND OF THE INVENTION

This invention relates to increasing the molecular weight of a polyamide by using a designated catalyst.

U.S. Pat. No. 3,763,113 describes a process for the amidation of nylon 66 using as catalysts phosphonic acids of the formula:

$$R(PO_3H_2)_n$$

wherein n is 1, 2 or 3, and R is a mono-, di-, or trivalent organic radical depending on the value of n. Example 10 shows the use of a weakly activating substituent (p-$PO_3H_2C_6H_4$—). The results, however, as stated in the patent clearly show that this example gives results which are only slightly better than phenylphosphonic acid as measured by the relative viscosity of the final product. There is no indication from the Examples that moderate or strongly activating groups would have a significant effect on the rate of reaction.

U.S. Pat. No. 3,365,428 describes a process for the amidation of nylons using as catalysts phosphinic acids of the formula:

$$RR'PO_2H$$

wherein R is an aryl or alkaryl radical, and R' is hydrogen or an alkyl, aralkyl, aryl or alkaryl radical. Example 8 shows the use of the weakly activating substituents $CH_3$— and $C_6H_5$—; as stated in this Example, the results as obtained are similar to the results obtained using a similar amount of phenylphosphinic acid. There is no indication from the Examples that moderate or strongly activating groups would have a significant effect on the rate of reaction.

Thus a need still exists for catalysts which will effect the rate of reaction for increasing molecular weight. Greater throughput, or for the same reaction time, production of a higher molecular weight material would result in a higher strength material.

BRIEF SUMMARY OF THE INVENTION

According to this invention there has been discovered an improved process for increasing the molecular weight of a polyamide, consisting essentially of heating the polyamide in the presence of a catalyst to effect a desired increase in molecular weight, wherein the improvement is employing, as the catalyst, at least one compound of the formulae A or B:

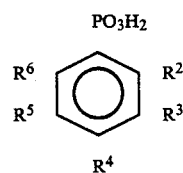

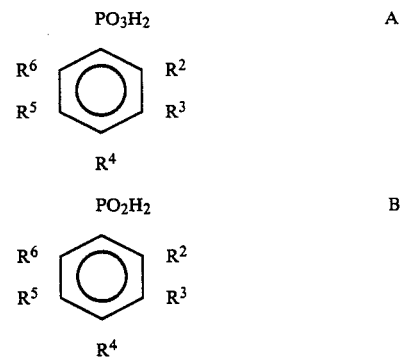

wherein $R^2$, $R^4$, and $R^6$ are independently selected from the group H, $R_2N$—, RO—, RS—, R—, wherein R is $C_xH_{2x+1}$ with x=1 to 10, $C_6H_5$— and $C_6H_5CH_2$— with the proviso that $R^2$, $R^4$ and $R^6$ cannot be hydrogen simultaneously and with the further proviso that when only H or R groups are present in the molecule at least one of $R^2$ or $R^6$ be R. $R^3$ and $R^5$ are independently selected from the group H, $R_2N$—, RO—, RS—, R, wherein R is $C_xH_{2x+1}$ with x=1 to 10, $C_6H_5$— and $C_6H_5CH_2$—.

These catalysts unexpectedly provide a substantial increase in the rate of amidation as compared to phenylphosphonic or phenylphosphinic acid.

DETAILED DESCRIPTION OF THE INVENTION

It is known in the art to use phenylphosphonic and phenylphosphinic acids as catalysts for increasing the molecular weight of a polyamide. It has now been unexpectedly found that substitution of the ortho or para hydrogen atoms of the phenylphosphonic or phenylphosphinic acid catalysts with electron releasing (activating) groups increases the relative viscosity several fold, i.e., 3 to 14 fold for the same reaction time.

More specifically the process of the instant invention is an improved process for increasing the molecular weight of a polyamide, comprising heating the polyamide in the presence of a catalyst to effect a desired increase in molecular weight wherein the improvement comprises employing, as the catalyst, at least one compound of the formulae A or B:

wherein $R^2$, $R^4$, and $R^6$ are independently selected from the group H, $R_2N$—, RO—, RS—, R—, wherein R is $CxH_{2x+1}$ with x=1 to 10, $C_6H_5$— and $C_6H_5CH_2$— with the proviso that $R^2$, $R^4$ and $R^6$ cannot be hydrogen simultaneously and with the further proviso that when only H or R groups are present in the molecule least one of $R^2$ or $R^6$ be R. $R^3$ and $R^5$ are independently selected from the group H, $R_2N$—, RO—, RS—, R, wherein R is $C_xH_{2x+1}$ with x=1 to 10, $C_6H_5$— and $C_6H_5CH_2$—.

Among the preferred compounds are those wherein $R^2$ and $R^4=CH_3O$— and $R^3$, $R^5$, and $R^6=H$; $R^2=CH_3O$— and $R^3$, $R^4$, $R^5$, and $R^6=H$; $R^4=CH_3O$— and $R^2$, $R^3$, $R^5$, and $R^6$=H; $R^2$ and $R^5$=CH$_3$—, and $R^3$, $R^4$, and $R^6$=H.

Specific examples of substituted phenylphosphonic and phenylphosphinic acids are selected from 2-methoxyphenylphosphonic acid, 2,4-dimethoxyphenylphosphinic acid, 4-methoxyphenylphosphinic acid, 2,4-dimethoxyphenylphosphonic acid, 2,6-dimethylphenylphosphonic acid, 2-benzyloxyphenylphosphonic acid, 2-methylphenylphosphonic acid, and 4-methoxyphenylphosphonic acid.

Derivatives of substituted phenylphosphonic or phenylphosphinic acids which are easily hydrolyzed to the parent acid under the conditions of the polymerization reaction, such as the mono or diesters or the mono or diamides, are suitable for the process of this invention.

The catalysts used in the process of this invention are either available chemicals or chemicals which can be readily produced in accordance with known processes. A preferred process for making the phosphonic acid catalysts comprises photochemically reacting the appropriate halide with an alkyl phosphite (Arbuzov reaction) and hydrolyzing the phosphonite ester so produced (See, for example, J. B. Plumb et al., J. Org. Chem., 27, 4711 (1962)). A preferred process for making the phosphinic acid catalysts comprises reacting the appropriate aromatic with phosphorous trichloride in the presence of catalyst and hydrolyzing the aromatic phosphorous dichloride so produced (See, for example, Houben-Weyl, "Methoden Der Organischen Chemie", page 294 and following).

The polyamides used in the process of this invention are conventional. Polyamides are condensation products that contain recurring amide groups as integral parts of the main polymer chains. Linear polyamides are formed from condensation of bifunctional monomers.

Typical structural formulas of linear polyamides may be represented as

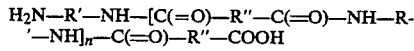

or

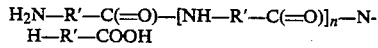

where R' and R" are linear or branched alkylene groups containing from 2 to 12 carbon atoms; R" may also be aromatic groups such as phenylene or naphthalyene and n represents the degree of polymerization or the number of recurring groups in the polymer chain. The value of n for a given polyamide such as nylon-6,6 should be such that the molecular weight is about 15,000 (40 RV). Preferred polyamides are nylons, including but not limited to nylon-6 and nylon-6,6. These and the other nylons known in the field are well described as to structure and manufacture, and for further reference, attention is invited to the patent and general literature, for example, the Kirk-Othmer Encyclopedia of Chemical Technology, 3rd edition, John Wiley and Sons, under the headings "Polyamide Fibers", and "Polyamide Plastics", as well as the Encyclopedia of Textiles, Fibers and Non-Woven Fabrics, John Wiley and Sons, Inc., 1984, pages 347–380, relating to polyamide fibers. For the purposes of the present invention, nylon-6,6 is the most preferred species.

The temperature range for the melting point of the polyamides to be used in the process of this invention is up to 360° C. The catalysts of this invention are preferably used at or above the melting temperature of the polyamide, the upper limit being generally dictated by the decomposition temperature of the polymer. In the case of nylon-6,6, the operating temperature is about 265°–300° C., preferably 270°–295° C.

Conversely, the catalysts can also be employed below the melting temperature of the polymer, preferably at least 15° C. below the melting point to avoid working with a hard to handle, sticky mass. For example, since nylon-6,6 melts at 260° C., the preferred operating temperature for employing the catalyst below the melting point is 170°–245° C.

The reaction time is sufficient to obtain the desired increase in molecular weight. For nylon-6,6 the increase in molecular weight which is desired is usually measured by the change in relative viscosity and can range from 10 to 600. This represents a change in molecular weight of from about 15,000 to about 45,000. The preferred reaction time being generally about 1 to 60 minutes for the liquid phase reaction. For the solid stage reaction the preferred reaction time being generally >15 minutes. Likewise, the amount of phosphonic and/or phosphinic catalysts employed in the reaction is sufficient to obtain a catalytic effect, the preferred concentration of phosphonic or phosphinic acid, for example, being about $\geq 0.1$ gram moles of catalyst per million grams of polyamide. Finally, the reaction is conducted preferably in the absence of air, for example, in the presence of an inert gas such as nitrogen, helium or argon.

In the following Examples, all temperatures are set forth uncorrected in degrees Celsius and unless otherwise indicated, all parts and percentages are by weight.

Both the catalysts of this invention and comparative catalysts are tested in a thin film polymerizer. This is an apparatus for conducting small scale nylon polymerizations under controlled conditions of temperature, water vapor pressure, and reaction time; in principal all the factors necessary for the determination of amidation kinetics. Essentially, a low molecular weight nylon sample is melted under its equilibrium steam pressure, the steam pressure is reduced, and the reaction quenched before a new equilibrium is attained. By relative viscosity analysis one can then determine how fast the sample approached the new equilibrium and thus amidation kinetics and catalytic factors. An important feature of the thin film polymerizer is that the nylon samples are melted in broad cups, allowing the melt to spread out as a pool 2 mm deep that can respond rapidly to changes in steam pressure.

EXAMPLES

General Procedure for Determining Increase in Relative Viscosity

Six cups, each containing 1 gram of powdered nylon containing the catalyst are placed in a stainless steel sample chamber with 5 ml of water. The nylon samples are melted and brought to reaction temperature as rapidly as possible by dropping the reaction chamber into a preheated 280° sand bath. The water begins to evaporate creating a steam atmosphere inside the reaction vessel. A check valve on the reaction vessel maintains a constant steam pressure of 780 mm. When the internal reactor temperature nears 280°, temperature control for the sand bath is switched to a thermocouple inside the reactor. A total of 45–60 minutes is required to attain a stable operating temperature of 280°±1°. As soon as the reaction vessel stabilizes at 280°±1° the steam pressure is reduced from 780 mm to 100 mm to initiate polymerization. The polymerization is allowed to proceed for the indicated time and is then quenched by rapid cooling. The polymer is chopped to a coarse powder and its relative viscosity is determined in an 8.5% by weight solution of 6,6-nylon in 90% formic acid (balance H$_2$O) at 25°.

EXAMPLES 1–12

The general procedure outlined above was followed using a catalyst concentration of 10 g moles/ 10$^6$ grams of nylon, 6-6. The reaction time was 5 minutes.

| Example/Catalyst | | Increase in RV |
| --- | --- | --- |
| A. | Phenylphosphonic Acid | 47 |
| B. | Phenylphosphinic Acid | 37 |
| 1. | 2,4-dimethoxyphenylphosphinic Acid | 508 |
| 2. | 2-methoxyphenylphosphonic Acid | 499 |
| 3. | 4-methoxyphenylphosphinic Acid | 464 |
| 4. | 2,4-dimethoxyphenylphosphonic Acid | 333 |
| 5. | 2,6-dimethylphenylphosphonic Acid | 307 |
| 6. | 2-benzyloxyphenylphosphonic Acid | 283 |
| 7. | 4-methoxyphenylphosphonic Diamide | 263 |
| 8. | 2-methylphenylphosphonic Acid | 260 |
| 9. | 4-methoxyphenylphosphonic Acid | 257 |
| 10. | 2-methoxyphenyldiethylphosphonate | 255 |
| 11. | 2,5-dimethylphenylphosphinic Acid | 146 |
| 12. | 2,5-dimethylphenylphosphonic Acid | 132 |

The results clearly show that the phenylphophonic or phenylphosphinic acids containing electron releasing groups in the ortho or para positions of the phenyl ring are much more reactive amidation catalysts as evidenced by the fact that the increase in RV is 3 to 14 fold higher when compared to the unsubstituted acids.

What is claimed is:

1. In a process for increasing the molecular weight of a polyamide, consisting essentially of heating the polyamide in the presence of a catalyst, for a sufficient reaction time, to effect a desired increase in molecular weight, wherein the improvement consists essentially of employing, as the catalyst, at least one compound of the formulae selected from A or B:

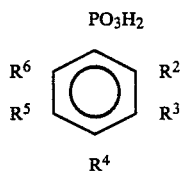

A

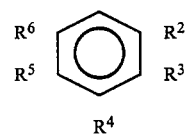

B wherein R$^2$, R$^4$, and R$^6$ are independently selected from the group H, R$_2$N—, RO—, RS—, or R—, wherein R is C$_x$H$_{2x1}$ with x=1 to 10, C$_6$H$_5$ or C$_6$H$_5$CH$_2$— with the proviso that R$^2$, R$^4$ or R$^6$ be other than hydrogen when any two of R$^2$, R$^4$ and R$^6$ are H simultaneously and R$^3$ and R$^5$ are independently selected from the group H, R$_2$N—, RO—, RS—, or R, wherein R is C$_x$H$_{2x+1}$ with x=1 to 10, C$_6$H$_5$— or C$_6$H$_5$CH$_2$— with the further proviso that when R$^2$, R$^3$, R$^4$, R$^5$, and R$^6$ are H or R, then at least one of R$^2$ or R$^6$ must be an R group.

2. The process of claim 1 wherein R$^2$ and R$^4$ are CH$_3$O— and R$^3$, R$^5$, and R$^6$ are H; R$^2$ is CH$_3$O— and R$^3$, R$^4$, R$^5$, and R$^6$ are H; R$^4$ is CH$_3$O— and R$^2$, R$^3$, R$^5$, and R$^6$ are H; R$^2$ and R$^5$ are CH$_3$—, and R$^3$, R$^4$, and R$^6$, are H.

3. The process of claim 1 wherein the catalysts are selected from 2-methoxyphenylphosphonic acid, 2,4-dimethoxyphenylphosphinic acid, 4-methoxyphenylphosphinic acid, 2,4-dimethoxyphenylphosphonic acid, 2,6-dimethylphenylphosphonic acid, 2-benzyloxyphenylphosphonic acid, 2-methylphenylphosphonic acid, or 4-methoxyphenylphosphonic acid.

4. The process of claim 1 wherein the polyamide is selected from

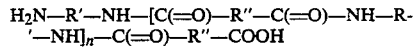

or

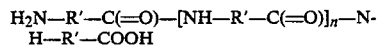

where R' is from the group consisting of linear or branched alkylene groups containing from 2 to 12 carbon atoms and aromatic groups and R" is from the group consisting of linear and branched alkylene groups containing from 2 to 12 carbons and n represents the degree of polymerization or the number of recurring groups in the polymer chain.

5. The process of claim 4 wherein the polyamide is nylon-6,6.

6. The process of claim 5 wherein the value of n is such that the molecular weight as measured by the change in relative viscosity is about 15,000 and the relative viscosity as measured in an 8.5% by weight solution of 6,6-nylon in 90% formic acid in water at 25 C. is about 40.

7. The process of claim 4 consisting of reacting the catalyst and the polyamide in a liquid phase reaction for a reaction time of about 1 to 60 minutes.

8. The process of claim 4 consisting of reacting the catalyst and the polyamide in a solid state reaction for a reaction time of >15 minutes.

* * * * *